(12) United States Patent
Watanabe

(10) Patent No.: US 8,273,824 B2
(45) Date of Patent: Sep. 25, 2012

(54) PROCESS FOR PRODUCING RESIN COMPOSITION

(75) Inventor: Kenji Watanabe, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/087,616

(22) Filed: Apr. 15, 2011

(65) Prior Publication Data

US 2011/0294956 A1 Dec. 1, 2011

(30) Foreign Application Priority Data

May 28, 2010 (JP) ................. 2010-122442

(51) Int. Cl.
*C08J 3/00* (2006.01)
*C08J 3/24* (2006.01)
*C08K 7/02* (2006.01)
*C08L 23/08* (2006.01)
*C08L 23/12* (2006.01)
*C08L 23/10* (2006.01)
*C08L 67/00* (2006.01)
*C08L 67/02* (2006.01)

(52) U.S. Cl. ........................................ 525/65; 525/166
(58) Field of Classification Search .................... 525/65, 525/166

See application file for complete search history.

(56) References Cited

FOREIGN PATENT DOCUMENTS

| | | |
|---|---|---|
| EP | 2236547 A1 | 10/2010 |
| JP | 03-121146 A | 5/1991 |
| JP | 2009292861 A | 12/2009 |
| WO | 2009093748 A1 | 7/2009 |

*Primary Examiner* — Jeffrey Mullis
(74) *Attorney, Agent, or Firm* — Panitch Schwarze Belisario & Nadel LLP

(57) ABSTRACT

A production process of a resin composition containing 100 parts by weight of a polyester fiber, 1 to 600 parts by weight of a copolymer of ethylene with a glycidyl group-carrying monomer, and 0.3 to 500 parts by weight of an unsaturated carboxylic acid-modified polyolefin resin, the process comprising steps of (1) melt-kneading the copolymer with the modified polyolefin resin, and (2) kneading the resultant melted resin with the polyester fiber at a temperature lower than a melting point of the polyester fiber.

4 Claims, No Drawings

PROCESS FOR PRODUCING RESIN COMPOSITION

FIELD OF THE INVENTION

The present invention relates to a process for producing a resin composition.

BACKGROUND OF THE INVENTION

As a resin composition containing a fiber and an olefin polymer, JP 03-121146A discloses a long fiber-reinforced polyolefin resin composition for making a molded article, containing a polyolefin, a modified olefin polymer and a fiber, wherein substantially all of the fibers are 2 mm or longer in their length, and are arranged nearly in parallel with one another; JP 2009-292861A discloses a molded article of a resin composition containing a matrix polymer, a modified polymer and an organic polymer fiber which carries on its surface a substituted group capable of a condensation reaction with a carboxyl group or an acid anhydride group of the modified polymer; and EP 2236547A (corresponding to WO 2009/093748) discloses a resin composition which contains (A) a surface-treated fiber comprising a polyalkylene terephthalate fiber and/or polyalkylene naphthalene dicarboxylate fiber and a sizing agent adhered to the surface of the fiber, and (B) a polyolefin resin modified with an unsaturated carboxylic acid and/or an unsaturated carboxylic acid derivative.

SUMMARY OF THE INVENTION

However, although the above resin compositions are a light-weight resin composition, they are not satisfactory in their stiffness and hardness.

In view of the above circumstances, the present invention has an object to provide a process for producing a resin composition which contains a fiber and an olefin polymer, and is light in its weight and high in its stiffness and hardness.

The present invention is a process for producing a resin composition, comprising steps of:

(1) melt-kneading an ethylene copolymer containing an ethylene unit and a glycidyl group-carrying monomer unit with a modified polyolefin resin produced by modifying a polyolefin resin with an unsaturated carboxylic acid and/or an unsaturated carboxylic acid derivative, thereby making a melted resin; and (2) melt-kneading the melted resin with a polyester fiber at a temperature lower than a melting point of the polyester fiber;

wherein the resin composition contains 100 parts by weight of the polyester fiber, 1 to 600 parts by weight of the ethylene copolymer, and 0.3 to 500 parts by weight of the modified polyolefin resin, and contents Bx, By, Cx and Cy satisfy following formula (1), $$0.05 \leq Cx \cdot Cy / Bx \cdot By \leq 0.5 \tag{1}$$

Bx being a content of the ethylene copolymer in the resin composition; By being a content of the glycidyl group-carrying monomer unit in the ethylene copolymer; Cx being a content of the modified polyolefin resin in the resin composition; and Cy being a content of a unit of the unsaturated carboxylic acid and/or a unit of the unsaturated carboxylic acid derivative in the modified polyolefin resin. This process is hereinafter referred to as "production process-1".

Also, the present invention is a process for producing a resin composition, comprising steps of:

(1) melting an ethylene copolymer containing an ethylene unit and a glycidyl group-carrying monomer unit, or a modified polyolefin resin produced by modifying a polyolefin resin with an unsaturated carboxylic acid and/or an unsaturated carboxylic acid derivative, thereby making a melted resin;

(2) melt-kneading the melted resin with a polyester fiber at a temperature lower than a melting point of the polyester fiber, thereby making a mixture; and (3) melt-kneading the mixture with the ethylene copolymer or the modified polyolefin resin, whichever is not utilized in step (1), at a temperature lower than a melting point of the polyester fiber;

wherein the resin composition contains 100 parts by weight of the polyester fiber, 1 to 600 parts by weight of the ethylene copolymer, and 0.3 to 500 parts by weight of the modified polyolefin resin, and contents Bx, By, Cx and Cy satisfy following formula (1), $$0.05 \leq Cx \cdot Cy / Bx \cdot By \leq 0.5 \tag{1}$$

Bx being a content of the ethylene copolymer in the resin composition; By being a content of the glycidyl group-carrying monomer unit in the ethylene copolymer; Cx being a content of the modified polyolefin resin in the resin composition; and Cy being a content of a unit of the unsaturated carboxylic acid and/or a unit of the unsaturated carboxylic acid derivative in the modified polyolefin resin. This process is hereinafter referred to as "production process-2".

DETAILED DESCRIPTION OF THE INVENTION

1. Polyester Fiber

Examples of the polyester fiber in the present invention are a polyester fiber produced from an alkylene glycol and an aromatic dicarboxylic acid, such as a polyethylene terephthalate fiber, a polybutylene terephthalate fiber, a polyethylene naphthalate fiber, and a polybutylene isophthalate fiber; a polyester fiber produced from terephthalic acid and 1,4-cyclohexane dimethanol; a polyester fiber produced by a polycondensation reaction of a dicarboxylic acid such as maleic acid, phthalic acid and adipic acid with bisphenol A; a polyester fiber produced by a polycondensation reaction of an aromatic dicarboxylic acid such as terephthalic acid with an aromatic dihydroxy compound such as bisphenol A; and a polyester fiber produced by a polycondensation reaction of an aromatic dicarboxylic acid such as isophthalic acid with an aromatic hydroxycarboxylic acid such as p-hydroxybenzoic acid. Among them, preferred is a polyester fiber produced from an alkylene glycol and an aromatic dicarboxylic acid.

The polyester fiber used in the present invention has single yarn fineness of preferably 1 denier or larger from a viewpoint of stable yarn-making, and preferably 30 denier or smaller from a viewpoint of interface strength between the polyester fiber and the resin; more preferably 2 denier or larger from a viewpoint of dispersion of the polyester fiber in the resin; and more preferably 18 denier or smaller from a viewpoint of a reinforcement effect generated by the polyester fiber.

The polyester fiber used in step (2) of production process-1 or in step (2) of production process-2 has weight-average length of generally 1 to 50 mm, preferably 2 to 30 mm, and more preferably 3 to 25 mm.

The polyester fiber has a binder on its surface in an amount of preferably 0.1 to 10 parts by weight, and more preferably 0.1 to 3 parts by weight, per 100 parts by weight of the polyester fiber. Examples of the binder are a polyolefin resin, a polyurethane resin, a polyester resin, an acrylic resin, an epoxy resin, starch, plant oil, and a mixture of those respective binders with an epoxy compound. The binder is preferably a polyolefin resin, a polyurethane resin, or a combination thereof. The polyolefin resin may be the same as a polyolefin resin used as an optional component explained hereinafter.

2. Ethylene Copolymer

The ethylene copolymer in the present invention means a copolymer containing an ethylene unit and a glycidyl group-carrying monomer unit. The "unit" means a polymerization unit derived from a monomer. Examples of the glycidyl group-carrying monomer are an $\alpha,\beta$-unsaturated glycidyl ester such as glycidyl methacrylate and glycidyl acrylate; and an $\alpha,\beta$-unsaturated glycidyl ether such as allyl glycidyl ether and 2-methylallyl glycidyl ether. Among them, preferred is glycidyl methacrylate.

It is preferable that the ethylene copolymer does not contain a unit of an aromatic vinyl compound, such as styrene, $\alpha$-methylstyrene, 4-methylstyrene, 4-methoxystyrene, chlorostyrene, and 2,4-dimethylstyrene.

The ethylene copolymer may contain a unit of other monomer. Examples of the other monomer are an unsaturated carboxylic ester such as methyl acrylate, ethyl acrylate, methyl methacrylate, and butyl acrylate; and an unsaturated vinyl ester such as vinyl acetate and vinyl propionate.

The ethylene copolymer has a melt flow rate of preferably 0.1 to 500 g/10 minutes, and more preferably 10 to 400 g/10 minutes, measured at 190° C. under a load of 21.18 N according to JIS K 7210 (1995), "JIS" meaning Japan Industrial Standard.

Examples of a production process of the ethylene copolymer are (i) a process comprising copolymerizing ethylene with a glycidyl group-carrying monomer by a polymerization method such as a high-pressure radical polymerization method, a solution polymerization method and an emulsion polymerization method, and (ii) a process comprising graft-copolymerizing a glycidyl group-carrying monomer onto an ethylene unit-carrying polymer such as polyethylene.

The above content (Bx), which is a content of the ethylene copolymer in the resin composition, is 1 to 600 parts by weight, preferably 2 to 420 parts by weight, and more preferably 3 to 300 parts by weight, per 100 parts by weight of the polyester fiber. When the content is smaller than 1 part by weight, or is larger than 600 parts by weight, the resin composition in the present invention may be insufficient in its stiffness and hardness.

The above content (By), which is a content of the glycidyl group-carrying monomer unit in the ethylene copolymer, is preferably 0.01 to 30% by weight, and more preferably 0.1 to 25% by weight, provided that the total of the ethylene unit and the glycidyl group-carrying monomer unit is 100% by weight.

The above content (By) is measured according to a method, comprising steps of:

(1) dissolving 1.0 g of the ethylene copolymer in 100 mL of xylene, thereby preparing a solution;

(2) adding the solution by drops to 1,000 mL of methanol under agitation, thereby precipitating the ethylene copolymer;

(3) drying the ethylene copolymer in a vacuum at 80° C. for 8 hours, thereby obtaining the dried ethylene copolymer;

(4) hot-pressing the dried ethylene copolymer, thereby forming a 100 μm-thick film;

(5) measuring an IR spectrum of the film;

(6) determining quantity of a characteristic absorption (910 $cm^{-1}$) assigned to the glycidyl group-carrying monomer unit; and (7) calculating the content (By) based on the above quantity, by a calibration curve method.

3. Modified Polyolefin Resin

The modified polyolefin resin in the present invention is obtained by modifying a polyolefin resin, which is a homopolymer of an olefin or a copolymer of two or more olefins, with an unsaturated carboxylic acid and/or an unsaturated carboxylic acid derivative. Accordingly, the modified polyolefin resin contains in its molecule a partial structure derived from the unsaturated carboxylic acid and/or the unsaturated carboxylic acid derivative.

Examples of the above unsaturated carboxylic acid are maleic acid, fumaric acid, itaconic acid, acrylic acid and methacrylic acid. Among them, preferred is maleic acid or acrylic acid.

Examples of the above unsaturated carboxylic acid derivative are acid anhydrides of the above unsaturated carboxylic acids, esters thereof, amides thereof, imides thereof, and metal salts thereof. Specific examples thereof are maleic anhydride, itaconic anhydride, methyl acrylate, ethyl acrylate, butyl acrylate, methyl methacrylate, ethyl methacrylate, butyl methacrylate, 2-hydroxyethyl methacrylate, monoethyl maleate, diethyl maleate, monomethyl fumarate, dimethyl fumarate, acrylamide, methacrylamide, monoamides of maleic acid, diamides of maleic acid, monoamides of fumaric acid, maleimide, N-butylmaleimide, and sodium methacrylate. Among them, preferred is maleic anhydride or 2-hydroxyethyl methacrylate.

Examples of the modified polyolefin resin are following (a) to (c) and a combination thereof:

(a) a modified polyolefin resin obtained by graft-polymerizing an unsaturated carboxylic acid and/or an unsaturated carboxylic acid derivative onto a homopolymer of an olefin;

(b) a modified polyolefin resin obtained by graft-polymerizing an unsaturated carboxylic acid and/or an unsaturated carboxylic acid derivative onto an olefin copolymer; and (c) a modified polyolefin resin obtained by graft-polymerizing an unsaturated carboxylic acid and/or an unsaturated carboxylic acid derivative onto an olefin block copolymer, wherein the olefin block copolymer means a copolymer obtained by a production process comprising step of (c-1) polymerizing an olefin, thereby making an olefin homopolymer, and (c-2) copolymerizing two or more olefins in the presence of the olefin homopolymer.

Among above modified polyolefin resins (a) to (c), preferred is modified polyolefin resin (c), and more preferred is a modified polyolefin resin obtained by graft-polymerizing maleic anhydride or 2-hydroxyethyl methacrylate onto an olefin block copolymer containing an ethylene unit and/or a propylene unit as a major unit.

Examples of a method for carrying out the above graft-polymerization are a solution method, a bulk method, a melt-kneading method, and a combination thereof. Those methods are specifically disclosed in a literature such as "Jitsuyo Polymer Alloy Sekkei" authored by Humio IDE, published by Kogyo Chosakai Publishing Co., Ltd. (1996), Prog. Polym. Sci., 24, 81-142 (1999), JP 2002-308947A, JP 2004-292581A, JP 2004-217753A, and JP 2004-217754A.

From a viewpoint of mechanical strength such as stiffness and hardness of the resin composition obtained in the present invention, a grafting efficiency in the above graft-polymerization is preferably 0.51 or larger. The grafting efficiency can be measured by a method, comprising steps of:

(1) dissolving 1.0 g of the modified polyolefin resin in 100 mL of xylene, thereby preparing a solution;

(2) adding the solution by drops to 1,000 mL of methanol under agitation, thereby precipitating the modified polyolefin resin;

(3) recovering the precipitated modified polyolefin resin;

(4) vacuum-drying the recovered modified polyolefin resin at 80° C. for 8 hours, thereby obtaining the purified modified polyolefin resin;

(5) hot-pressing the purified modified polyolefin resin, thereby forming a 100 μm-thick film;

(6) measuring an IR spectrum of the film;

(7) determining quantity of a characteristic absorption (1,780 cm$^{-1}$) assigned to the unsaturated carboxylic acid and/or unsaturated carboxylic acid derivative, and then calculating, based on the above quantity, the content (X1) of the unsaturated carboxylic acid and/or unsaturated carboxylic acid derivative chemically-bonded to the polyolefin resin;

(8) separately, performing above steps (5) and (6) on the original (namely, not purified) modified polyolefin resin, and calculating the content (X2) of the unsaturated carboxylic acid and/or unsaturated carboxylic acid derivative, X2 being synonymous with the above Cy, and being the total of the above content (X1) and the content of the unsaturated carboxylic acid and/or unsaturated carboxylic acid derivative non-bonded to the polyolefin resin (namely, free unsaturated carboxylic acid and/or unsaturated carboxylic acid derivative); and (9) calculating the grafting efficiency, X1/X2.

The above content (Cx), which is a content of the modified polyolefin resin in the resin composition, is 0.3 to 500 parts by weight, preferably 0.5 to 360 parts by weight, and more preferably 1 to 250 parts by weight, per 100 parts by weight of the polyester fiber. When the content is smaller than 0.3 part by weight, or is larger than 500 parts by weight, the resin composition in the present invention may be insufficient in its stiffness and hardness.

The above content (Cy) is preferably 0.1 to 20% by weight, and more preferably 0.1 to 10% by weight, from a viewpoint of mechanical strength such as stiffness and hardness of the resin composition obtained in the present invention, provided that the total of the modified polyolefin resin is 100% by weight.

4. Optional Component 4-1. Polyolefin Resin

Step (1) of production process-1 and step (1) and/or step (3) of production process-2 may melt-knead a polyolefin resin together, which is different from the above ethylene copolymer and modified polyolefin resin. The polyolefin resin is a homopolymer of an olefin or a copolymer of two or more olefins. Examples thereof are a polypropylene resin, a polyethylene resin, and a combination thereof. Among them, preferred is a polypropylene resin.

Examples of the polypropylene resin are a homopolymer of propylene, a propylene-ethylene random copolymer, a propylene-α-olefin random copolymer, a propylene-ethylene-α-olefin random copolymer, and a propylene block copolymer. The propylene block copolymer means a copolymer produced by a process comprising steps of (i) polymerizing propylene, thereby making a homopolymer of propylene, and (ii) copolymerizing ethylene and propylene in the presence of the homopolymer of propylene. Among them, preferred is a homopolymer of propylene or a propylene block copolymer from a viewpoint of a heat resistance of the resin composition obtained.

A content of an ethylene unit in the above propylene-ethylene random copolymer (provided that the total of a propylene unit and an ethylene unit is 100% by mol), a content of an α-olefin unit in the above propylene-α-olefin random copolymer (provided that the total of a propylene unit and an α-olefin unit is 100% by mol), and a total content of an ethylene unit and an α-olefin unit in the above propylene-ethylene-α-olefin random copolymer (provided that the total of a propylene unit, an ethylene unit and an α-olefin unit is 100% by mol) are smaller than 50% by mol. Those contents of respective monomer units can be measured by an IR method or an NMR method disclosed in "Kobunshi Bunseki Handbook (New Edition)" edited by Chemical Society of Japan and Polymer Analysis Research Society, published by Kinokuniya Co., Ltd. (1995).

Examples of the above polyethylene resin are a homopolymer of ethylene, an ethylene-propylene random copolymer, an ethylene-α-olefin random copolymer, and an ethylene-propylene-α-olefin random copolymer. A content of a propylene unit in the above ethylene-propylene random copolymer (provided that the total of an ethylene unit and a propylene unit is 100% by mol), a content of an α-olefin unit in the above ethylene-α-olefin random copolymer (provided that the total of an ethylene unit and an α-olefin unit is 100% by mol), and a total content of a propylene unit and an α-olefin unit in the above ethylene-propylene-α-olefin random copolymer (provided that the total of an ethylene unit, a propylene unit, and an α-olefin unit is 100% by mol) are smaller than 50% by mol.

Examples of the α-olefin in the above polyolefin resin are 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, 5-methyl-1-hexene, 3,4-dimethyl-1-pentene, 3-ethyl-1-pentene, 2,3,3-trimethyl-1-butene, 3-methyl-3-ethyl-1-butene, 1-octene, 4-methyl-1-pentene, 5-ethyl-1-hexene, 4,4-dimethyl-1-hexene, 6-propyl-1-heptene, 6-methyl-6-ethyl-1-heptene, 3,4,4-trimethyl-1-pentene, 4-propyl-1-pentene, 3,3-diethyl-1-butene, 1-nonene, 1-decene, 1-undecene, and 1-dodecene. Among them, preferred is an α-olefin having 4 to 8 carbon atoms such as 1-butene, 1-pentene, 1-hexene or 1-octene.

The above polyolefin resin can be produced by a polymerization method such as a solution polymerization method, a slurry polymerization method, a bulk polymerization method, and a gas phase polymerization method, and combined methods of two or more thereof. More specific examples of a method for producing the polyolefin resin are disclosed in a literature such as "New Polymer Production Process" edited by Yasuji SAEKI, published by Kogyo Chosakai Publishing, Inc. (1994), JP 4-323207A and JP 61-287917A.

Examples of a preferable polymerization catalyst for producing the polyolefin resin are a multi-site catalyst such as a catalyst obtained by using a solid catalyst component containing a titanium atom, a magnesium atom and a halogen atom, and a single-site catalyst such as a metallocene catalyst. Among them, preferred is the above specifically-exemplified multi-site catalyst for producing a polypropylene resin as the polyolefin resin.

The polyolefin resin has a melt flow rate of preferably 40 to 200 g/10 minutes measured at 230° C. under a load of 21.2 N according to ASTM D1238, from a viewpoint of dispersibility of the polyester fiber in the resin composition obtained, and from a viewpoint of mechanical properties of the resin composition obtained, such as stiffness and hardness.

The above homopolymer of propylene as the polyolefin resin has an isotactic pentad fraction of preferably 0.95 to 1.00, more preferably 0.96 to 1.00, and further preferably 0.97 to 1.00. The is tactic pentad fraction means a fraction of an isotactic chain contained in a molecular chain of the homopolymer of propylene on a pentad basis; in other words, a fraction of a propylene monomer unit existing in the center of a chain consisting of a sequential meso-combination of five propylene monomer units, which is measured by a $^{13}$C-NMR method disclosed in Macromolecules, 6, 925 (1973) authored by A. Zambelli et al., provided that an NMR absorption peak is identified by a method disclosed in Macromolecules, 8, 687 (1975).

When the polyolefin resin is the above propylene block copolymer, (1) the homopolymer of propylene in the propylene block copolymer has an isotactic pentad fraction of preferably 0.95 to 1.00, more preferably 0.96 to 1.00, and further preferably 0.97 to 1.00, (2) a content of the ethylene-propylene copolymer in the propylene block copolymer is preferably 10 to 20% by weight, provided that the total of the propylene block copolymer is 100% by weight, and (3) a content of an ethylene unit in the ethylene-propylene copolymer is preferably 25 to 45% by weight, provided that the ethylene-propylene copolymer is 100% by weight.

The above polyolefin resin is contained in the resin composition in an amount of generally 30 to 850 parts by weight, preferably 75 to 850 parts by weight, and more preferably 150 to 850 parts by weight, per 100 parts by weight of the polyester fiber. When the amount is smaller than 30 parts by weight, the resin composition obtained may be heavy in its weight. When the amount is larger than 850 parts by weight, the resin composition obtained may be insufficient in its stiffness and hardness.

4-2. Elastomer

Step (1) of production process-1 and step (1) and/or step (3) of production process-2 may melt-knead an elastomer together. Examples of the elastomer are a polyolefin elastomer, a polyester elastomer, a polyurethane elastomer, a polyvinyl chloride elastomer, and a combination of two or more thereof.

4-3. Additive

Any step of production processes-1 and -2 may use an additive. Examples of the additive are a stabilizer such as an antioxidant, a thermal stabilizer, a neutralizing agent and an ultraviolet absorber; an anti-forming agent; a flame retardant; a flame retardant synergist; a dispersing agent; an antistatic agent; a lubricating agent; an anti-blocking agent such as silica; a coloring agent such as a dye and a pigment; a plasticizer; a nucleating agent; and a crystallizing agent.

4-4. Inorganic Compound

An example of the inorganic compound is a plate-like, powder-particle-like or whisker-like inorganic compound such as glass flake, mica, glass powder, glass bead, talc, clay, alumina, carbon black, and wollastonite.

5. Production of Resin Composition 5-1. Step (1) of Production Process-1 and Step (1) of Production Process-2

Step (1) of production process-1 uses all the components at a time (one step method), or uses divided parts thereof one after another (multistep method). Respective steps (1) are not particularly limited in their temperature, as long as those components are melted. The temperature is preferably 170 to 300° C., and more preferably 180 to 230° C. Respective steps (1) are not particularly limited in their treating time. The time is preferably 30 minutes or shorter, and more preferably 10 minutes or shorter, in order to inhibit a thermal degradation of those components. Respective steps (1) are carried out preferably using a Banbury mixer, PLASTOMILL, BRABENDER PLASTOGRAPH, or an extruder such as a single screw extruder and a twin screw extruder. Among them, more preferred is an extruder, because the extruder can carry out continuously all the steps contained in the process of the present invention.

5-2. Step (2) of Production Process-1 and Steps (2) and (3) of Production Process-2

Those steps are carried out (i) at preferably 170 to 260° C., and more preferably 180 to 230° C., in order to inhibit melting of the polyester fiber, (ii) for preferably 30 minutes or shorter, and more preferably 10 minutes or shorter, in order to inhibit a thermal degradation of the polyester fiber, and (iii) using an apparatus preferably similar to that used in step (1).

A melt-kneaded product discharged from the final step of production processes-1 and -2, which is the resin composition in the present invention, is preferably transformed into a pellet with an apparatus such as a pelletizer. The pellet has a weight-average length of preferably 2 to 50 mm, more preferably 3 to 20 mm, and particularly preferably 5 to 15 mm, in order to fill the pellet easily into a mold cavity of an injection molding machine, and in order to obtain a molded article excellent in its strength. When the weight-average length is 2 mm or longer, the resin composition can be molded into an article having improved mechanical strength such as stiffness. When the weight-average length is 50 mm or shorter, the resin composition is easily molded into an article.

The above weight-average length of the pellet is preferably substantially the same as weight-average length of the polyester fiber contained in the pellet; namely, the polyester fiber contained in the pellet has weight-average length of preferably 90 to 110% of the weight-average length of the pellet. Therefore, the polyester fiber contained in the pellet also has weight-average length of preferably 2 to 50 mm, more preferably 3 to 20 mm, and particularly preferably 5 to 15 mm. Length of respective fibers for determining the above weight-average length is measured by a method, comprising steps of:

(1) putting one part by weight of the pellet in 50 or more parts by weight of xylene;
(2) refluxing the resultant mixture, thereby dissolving completely all the components other than the fiber;
(3) recovering the fiber by filtration; and
(4) measuring fiber length of 50 or more fibers.

Examples of a molding method of the resin composition in the present invention are an injection molding method, an injection compression molding method, and an extruding method.

An example of use of the molded article is a plastic part of a car such as an exterior part requiring mechanical strength, durability, a vibration damping characteristic, and a good appearance (for example, fender, over fender, grill guard, cowl louver, wheel cap, side protector, side maul, side lower skirt, front grill, side step, roof rail, rear spoiler and bumper), an interior part requiring stiffness at high temperature (for example, lower instrument panel and trim), and an engine part (for example, bumper beam, cleaning fan, fan shroud, ramp housing, car heater case, fuse box and air cleaner case).

Further examples of use thereof are a part of an electric product (for example, a housing for an electric tool, camera, video camera, microwave, electric rice-cooker, pot, cleaner, personal computer, copy machine, printer, FDD, and CRT); a part of a machine (for example, pump casing); and a part of a structure (for example, tank, pipe and building formwork).

EXAMPLE

The present invention is explained in more detail with reference to the following Examples, which do not limit the present invention.

1. Components Used
(1) Polyester Fiber
A-1: Polyethylene terephthalate fiber (weight-average length of 15 mm, 150 denier, 36 filaments, TARILIN DTY150/36/1 SET, manufactured by Nan Ya Plastics Corporation.

A-2: Polyethylene terephthalate fiber (75 denier, 36 filaments), TARILIN DTY75/36/1 SET, manufactured by Nan Ya Plastics Corporation.

(2) Ethylene Copolymer

Ethylene-glycidyl methacrylate copolymer, BONDFAST CG5001, manufactured by Sumitomo Chemical Co., Ltd., containing 19% by weight of glycidyl methacrylate unit (corresponding to a By value, the total of the ethylene-glycidyl methacrylate copolymer being 100% by weight), and having a melt flow rate of 380 g/10 minutes measured at 190° C. under a load of 21.18 N.

(3) Modified Polyolefin Resin

Maleic anhydride-modified polypropylene prepared by a method disclosed in Example 1 of JP 2004-197068A, and having a melt flow rate of 70 g/10 minutes measured at 230° C. under a load of 21.2 N, and containing 0.6% by weight of grafted maleic anhydride, and 0.3% by weight of non-grafted (free) maleic anhydride, the total of the maleic anhydride-modified polypropylene being 100% by weight.

(4) Polypropylene Resin (Polyolefin Resin as Optional Component)

Homopolymer of propylene, NOBLENE U501E1, manufactured by Sumitomo Chemical Co., Ltd., having a melt flow rate of 120 g/10 minutes measured at 230° C. under a load of 21.2 N, and an isotactic pentad fraction of 0.98.

Example 1

There was melt-kneaded 33 parts by weight of the above ethylene copolymer with 133 parts by weight of the above polypropylene resin for 1 minute at 190° C., using LABO PLASTOMILL (model C, screw rotation speed: 40 rpm) manufactured by Toyo Seiki Seisaku-sho, LTD, thereby making a melt-kneaded resin mixture. The melt-kneaded resin mixture was kneaded with 100 parts by weight of above polyester fiber A-1 at 190° C. (lower than a melting point of above polyester fibers A-1 and A-2) for 4 minutes. Then, the resultant mixture was melt-kneaded with 67 parts by weight of the above modified polyolefin resin at 190° C. for 3 minutes, thereby making a resin composition. The resin composition was hot-pressed at 190° C., thereby obtaining an about 1 mm-thick sheet. The sheet was cut into 10-mm-square pellets.

The pellets were injection molded using an injection molding machine (clamp capacity: 30 ton), Si-30III, manufactured by Toyo Machinery & Metal Co., Ltd., at cylinder temperature of 190° C., mold temperature of 50° C., and an injection speed of 20 mm/second under back pressure of 5 MPa, thereby obtaining a test piece.

The test piece was found to have a ratio, Cx·Cy/Bx·By, of 0.063 (because, 66 parts by weight×0.6% by weight/[33 parts by weight×19% by weight]=0.395/6.27=0.063), specific gravity of 1.03 measured according to ASTM D792, tensile fracture strength of 41.8 MPa, flexural strength of 41 MPa, and Rockwell hardness of 89. Results are shown in Table 1.

The above ultimate strength was measured according to ASTM D638, using an injection-molded 2 mm-thick test piece at 23° C. and an elongation rate of 10 mm/minute.

The above flexural strength was measured according to ASTM D790, using an injection-molded 4 mm-thick test piece at 23° C. and a loading speed of 2 mm/minute with a span of 64 mm (distance between supports).

The above Rockwell hardness was measured according to ASTM D785, using an injection-molded 4 mm-thick test piece at 23° C. under a load of 60 kg with a convex anvil (diameter: 6 mm) as a supporting instrument.

Example 2

Example 1 was repeated except that polyester fiber A-1 was changed to polyester fiber A-2, thereby obtaining pellets. Results are shown in Table 1.

Comparative Example 1

Example 1 was repeated except that (i) 33 parts by weight of the ethylene copolymer was changed to 100 parts by weight thereof, (ii) the melt-kneading time (4 minutes) in the presence of polyester fiber A-1 was changed to 7 minutes, and (iii) the modified polyolefin resin was not used, thereby obtaining pellets. Results are shown in Table 1.

Comparative Example 2

Example 1 was repeated except that (i) 33 parts by weight of the ethylene copolymer was changed to 100 parts by weight of the modified polyolefin resin, (ii) the melt-kneading time (4 minutes) in the presence of polyester fiber A-1 was changed to 7 minutes, and (iii) the modified polyolefin resin was not further used after adding polyester fiber-A, thereby obtaining pellets. Results are shown in Table 1.

Comparative Example 3

Example 1 was repeated except that (i) 33 parts by weight of the ethylene copolymer was changed to 66 parts by weight thereof, and (ii) 67 parts by weight of the modified polyolefin resin was changed to 33 parts by weight thereof, thereby obtaining pellets. Results are shown in Table 1.

Comparative Example 4

Example 1 was repeated except that the temperature (190° C.) was all changed to 280° C. (higher than a melting point of the polyester fiber), thereby obtaining a resin composition. The resin composition was found to contain no polyester fiber, because all of the polyester fiber used was completely melted to be kneaded with the resin. Results are shown in Table 1.

TABLE 1

|  | Example | | Comparative Example | | | |
| --- | --- | --- | --- | --- | --- | --- |
|  | 1 | 2 | 1 | 2 | 3 | 4 |
| Component used (part by weight) | | | | | | |
| 1. Polyester fiber | | | | | | |
|   (1) A-1 (150 denier, 36 filaments) | 100 |  | 100 | 100 | 100 | 100 |
|   (2) A-2 (75 denier, 36 filaments) |  | 100 |  |  |  |  |

TABLE 1-continued

| | | Example | | Comparative Example | | | |
|---|---|---|---|---|---|---|---|
| | | 1 | 2 | 1 | 2 | 3 | 4 |
| 2. | Ethylene copolymer | 33 | 33 | 100 | — | 66 | 33 |
| 3. | Modified polyolefin resin | 67 | 67 | — | 100 | 33 | 67 |
| 4. | Polypropylene resin | 133 | 133 | 133 | 133 | 133 | 133 |
| Evaluation of resin composition | | | | | | | |
| 1. | Ratio of $Cx \cdot Cy/Bx \cdot By$ | 0.063 | 0.063 | — | — | 0.016 | 0.063 |
| 2. | Specific gravity | 1.03 | 1.03 | 1.06 | 1.02 | 1.03 | 1.01 |
| 3. | Tensile fracture strength (MPa) | 41.8 | 46.4 | 28.7 | 37.5 | 35.3 | 27.7 |
| 4. | Flexural strength (MPa) | 41 | 41 | 29 | 42 | 33 | 33 |
| 5. | Rockwell hardness | 89 | 87 | 62 | 84 | 73 | 76 |

The invention claimed is:

1. A process for producing a resin composition, comprising steps of:

(1) melt-kneading an ethylene copolymer containing an ethylene unit and a glycidyl group-carrying monomer unit with a modified polyolefin resin produced by modifying a polyolefin resin with an unsaturated carboxylic acid and/or an unsaturated carboxylic acid derivative, thereby making a melted resin; and (2) melt-kneading the melted resin with a polyester fiber at a temperature lower than a melting point of the polyester fiber;

wherein the resin composition contains 100 parts by weight of the polyester fiber, 1 to 600 parts by weight of the ethylene copolymer, and 0.3 to 500 parts by weight of the modified polyolefin resin, and contents Bx, By, Cx and Cy satisfy following formula (1), $$0.05 \leq Cx \cdot Cy/Bx \cdot By \leq 0.5 \quad (1)$$

Bx being a content of the ethylene copolymer in the resin composition; By being a content of the glycidyl group-carrying monomer unit in the ethylene copolymer; Cx being a content of the modified polyolefin resin in the resin composition; and Cy being a content of a unit of the unsaturated carboxylic acid and/or a unit of the unsaturated carboxylic acid derivative in the modified polyolefin resin.

2. The process according to claim 1, wherein step (1) melt-kneads further 30 to 850 parts by weight of a polyolefin resin, per 100 parts by weight of the polyester fiber.

3. A process for producing a resin composition, comprising steps of:

(1) melting an ethylene copolymer containing an ethylene unit and a glycidyl group-carrying monomer unit, or a modified polyolefin resin produced by modifying a polyolefin resin with an unsaturated carboxylic acid and/or an unsaturated carboxylic acid derivative, thereby making a melted resin;

(2) melt-kneading the melted resin with a polyester fiber at a temperature lower than a melting point of the polyester fiber, thereby making a mixture; and (3) melt-kneading the mixture with the ethylene copolymer or the modified polyolefin resin, whichever is not utilized in step (1), at a temperature lower than a melting point of the polyester fiber;

wherein the resin composition contains 100 parts by weight of the polyester fiber, 1 to 600 parts by weight of the ethylene copolymer, and 0.3 to 500 parts by weight of the modified polyolefin resin, and contents Bx, By, Cx and Cy satisfy following formula (1), $$0.05 \leq Cx \cdot Cy/Bx \cdot By \leq 0.5 \quad (1)$$

Bx being a content of the ethylene copolymer in the resin composition; By being a content of the glycidyl group-carrying monomer unit in the ethylene copolymer; Cx being a content of the modified polyolefin resin in the resin composition; and Cy being a content of a unit of the unsaturated carboxylic acid and/or a unit of the unsaturated carboxylic acid derivative in the modified polyolefin resin.

4. The process according to claim 3, wherein a polyolefin resin is further melt-kneaded in step (1) and/or step (3), in an amount of 30 to 850 parts by weight per 100 parts by weight of the polyester fiber.

* * * * *